(12) United States Patent
Shigematsu

(10) Patent No.: US 7,243,751 B2
(45) Date of Patent: Jul. 17, 2007

(54) MOUNTING STRUCTURE FOR HEAT EXCHANGER

(75) Inventor: Satoshi Shigematsu, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 128 days.

(21) Appl. No.: 10/947,287

(22) Filed: Sep. 23, 2004

(65) Prior Publication Data
US 2005/0077095 A1    Apr. 14, 2005

(30) Foreign Application Priority Data
Oct. 10, 2003    (JP)    ............................. 2003-351942

(51) Int. Cl.
*B60K 11/04*    (2006.01)
(52) U.S. Cl. ..................... 180/68.4; 180/68.6
(58) Field of Classification Search ............... 180/68.4, 180/68.6
See application file for complete search history.

(56) References Cited

U.S. PATENT DOCUMENTS

| | | | | |
|---|---|---|---|---|
| 4,315,540 A | * | 2/1982 | Moranne | ..................... 165/67 |
| 4,619,313 A | * | 10/1986 | Rhodes et al. | ................. 165/67 |
| 5,271,473 A | * | 12/1993 | Ikeda et al. | ................. 180/68.4 |
| 5,358,304 A | * | 10/1994 | Kanemitsu et al. | .... 296/193.09 |
| 6,450,276 B1 | * | 9/2002 | Latcau | ....................... 180/68.4 |
| 6,578,650 B2 | * | 6/2003 | Ozawa et al. | .............. 180/68.1 |
| 6,634,448 B2 | * | 10/2003 | Bland | ........................ 180/68.1 |
| 6,684,937 B2 | * | 2/2004 | Lenz et al. | .................... 165/41 |
| 6,729,424 B2 | * | 5/2004 | Joutaki et al. | ............. 180/68.4 |
| 6,814,400 B2 | * | 11/2004 | Henderson et al. | .... 296/193.09 |
| 6,817,404 B2 | * | 11/2004 | Frana-Guthrie et al. | ...... 165/43 |
| 6,827,129 B2 | * | 12/2004 | Ozawa et al. | ................. 165/67 |

FOREIGN PATENT DOCUMENTS

JP    8-310258 A    11/1996

* cited by examiner

*Primary Examiner*—Christopher P. Ellis
*Assistant Examiner*—John Walters
(74) *Attorney, Agent, or Firm*—Foley & Lardner LLP

(57) ABSTRACT

A large-size weighty radiator (1) having an array of rubber dampers (21) at the bottom is mounted between transversely spaced side members (2) of a vehicle body, by a structure (M) including a hollow frame portion having a transversely extending body part (H1) and a pair of fixed parts (H2) fixed to the side members (2), and a receiving portion (H3) formed on the frame portion for receiving the array of rubber dampers (21) inserted thereto.

20 Claims, 3 Drawing Sheets

MOUNTING STRUCTURE FOR HEAT EXCHANGER

BACKGROUND OF THE INVENTION

1. Field of the Invention

The present invention relates to a mounting structure for a heat exchanger, and particularly, to a mounting structure for a large-scale weighty heat exchanger.

2. Relevant Art

Japanese Patent Application Laid-Open Publication No. 8-310258 has proposed a mounting structure for mounting a radiator to a vehicle body. The mounting structure includes: a bracket elastically mounted to a downside of the radiator, which bracket is provided with a pin to be inserted in an insertion hole in a lower portion of the vehicle body; and another bracket elastically mounted on an upside of the radiator, which bracket is provided with a button engageable with a button hole in an upper portion of the vehicle body, so that the radiator can be mounted to the vehicle body by a single operation.

This structure is adapted to mount the radiator to the vehicle body by a simple pin-inserting operation to the insertion hole, without use of fastening elements such as bolts and nuts, thus allowing an enhanced workability.

SUMMARY OF THE INVENTION

The above-noted mounting structure is addressed to a radiator to be mounted to a vehicle body in a gasoline-fueled automobile. Such a radiator is not so large in scale nor so weighty as a radiator for a fuel cell vehicle employing e.g. hydrogen gas as a fuel, and can be mounted to a vehicle body by insertion of a pin.

However, in assumed application to a large-scale weighty radiator, the pin and button as well as the brackets supporting them may normally receive undue loads from the radiator, with anxiety to a resultant rupture. To avoid such a result, one may provide the pin with an increased diameter, either bracket with an increased plate thickness, or the structure with an increased number of pins, with a resultant increase in total mass or component number in any case.

The present invention is achieved with such points in view. It therefore is an object of the invention to provide a mounting structure adapted, with an increased rigidity, for an ensured mounting of a large-scale, larger-weight heat exchanger to be fixed in position to a vehicle body.

To achieve the object, according to an aspect of the invention, there is provided a mounting structure for a heat exchanger to be mounted to a vehicle body having transversely spaced side members, the mounting structure comprising a transversely extending frame portion fixed to side members, and a receiving portion configured on the frame portion to receive a part of a heat exchanger inserted thereto.

BRIEF DESCRIPTION OF THE ACCOMPANYING DRAWINGS

The above and further objects and features as well as advantages of the invention will fully appear from the following detailed description of the preferred embodiments, when the same is read in conjunction with the accompanying drawings, in which.

DETAILED DESCRIPTION OF THE PREFERRED EMBODIMENTS

There will be detailed below a preferred embodiment of the invention, with reference to FIGS. 1–3, in which the invention is embodied as a mounting structure M (FIGS. 1–2) for a radiator 1 (FIGS. 1–2) to be mounted as a heat exchanger in a fuel cell vehicle that employs e.g. hydrogen gas as a fuel. It is noted that the radiator 1 is remarkably greater in both scale and weight than a radiator for a gasoline-fueled automobile.

Figure 1:
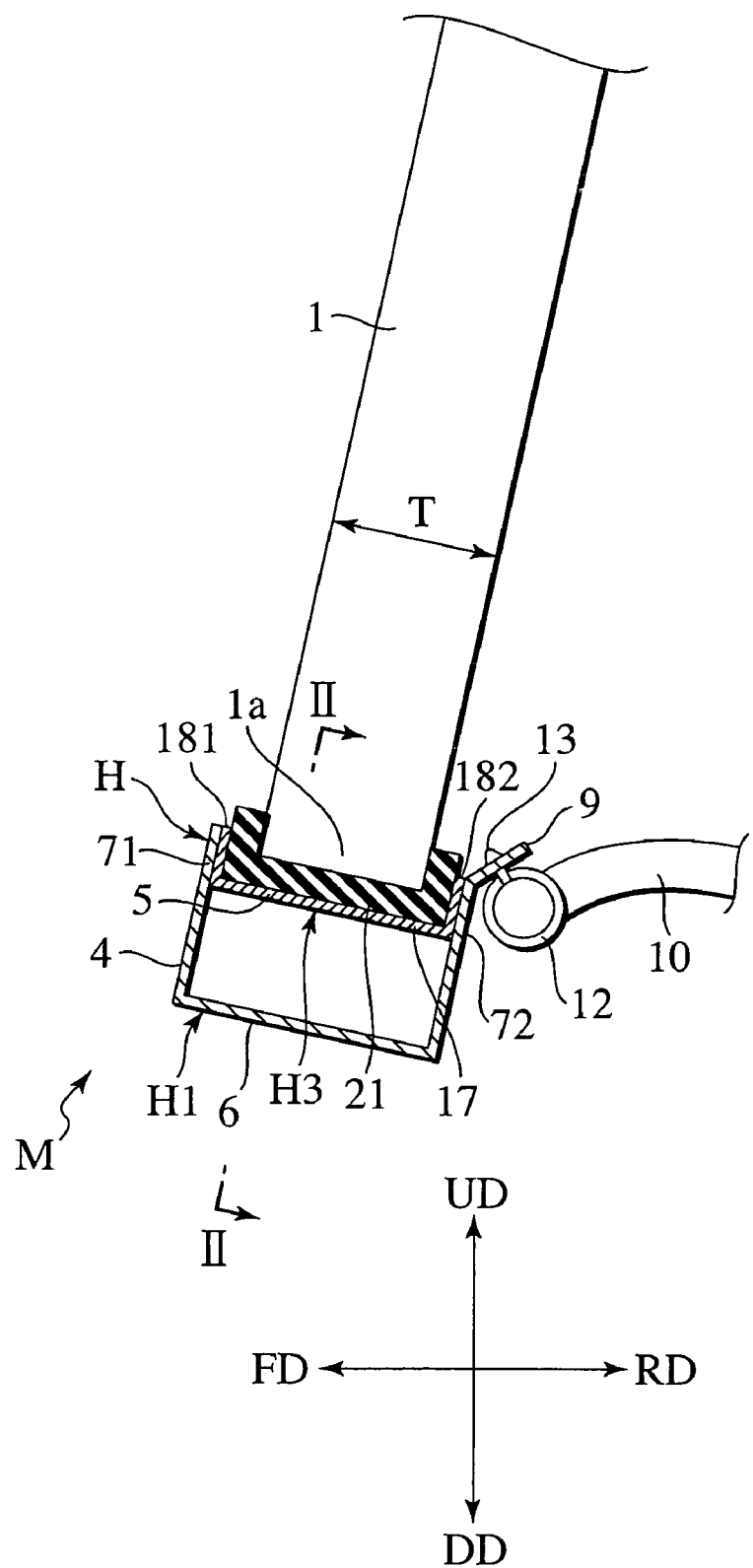
FIG. 1 is a cross-section of a mounting structure according to an embodiment of the invention, and corresponds to a section along line I—I of FIG. 2.
Figure 2:
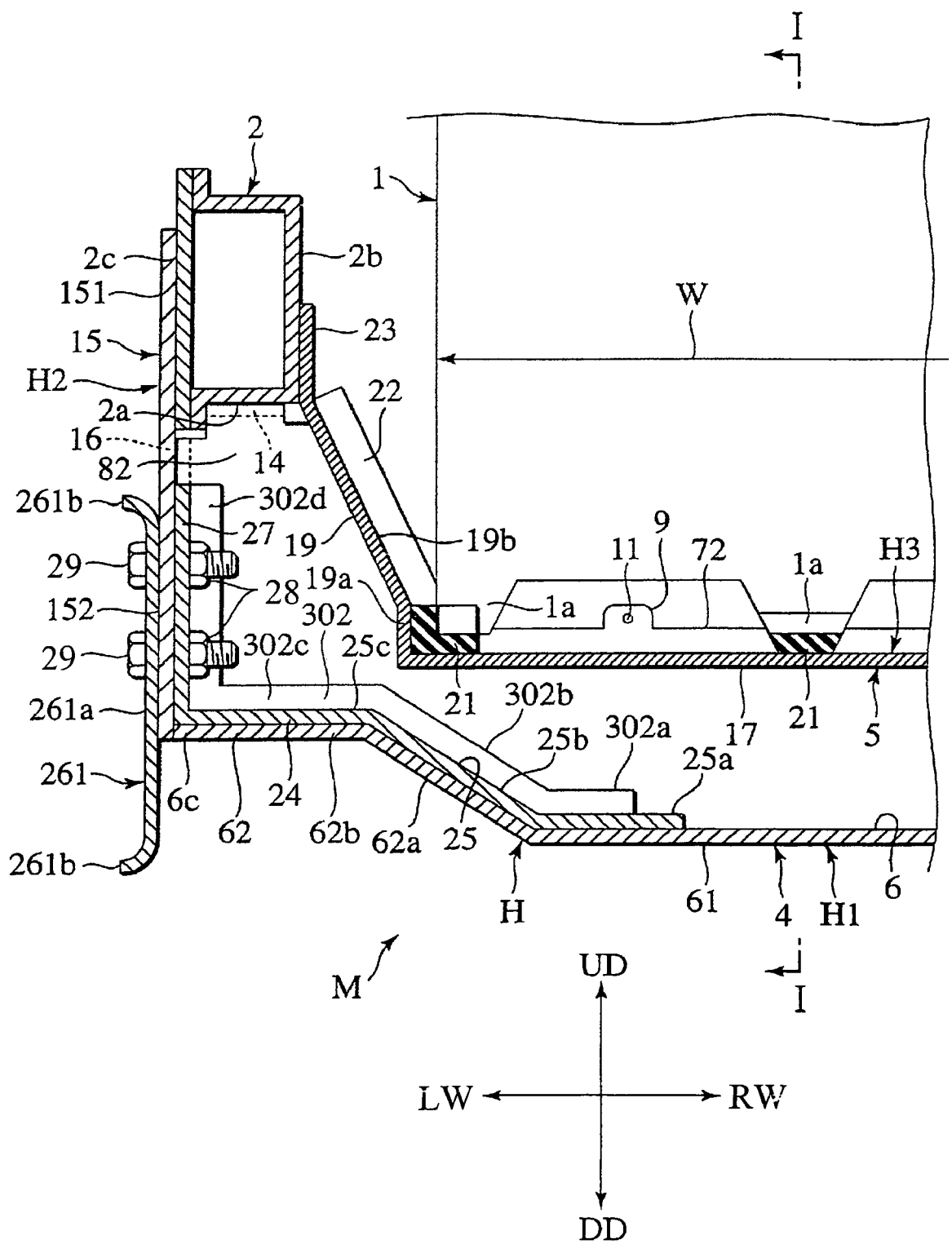
FIG. 2 is a section along line II—II of FIG. 1.

FIG. 1 shows a right side view of the mounting structure M, as a section along line I—I of FIG. 2. FIG. 2 shows a detailed section of the mounting structure M, along line II—II of FIG. 1. FIG. 3 is an exploded view of a hollow cross frame H forming the mounting structure M.

In those Figures, denoted by FD is a forward direction, RD is a rearward direction, UD is an upward direction, DD is a downward direction, LW is a leftward direction, and RW is a rightward direction.

Figure 3:
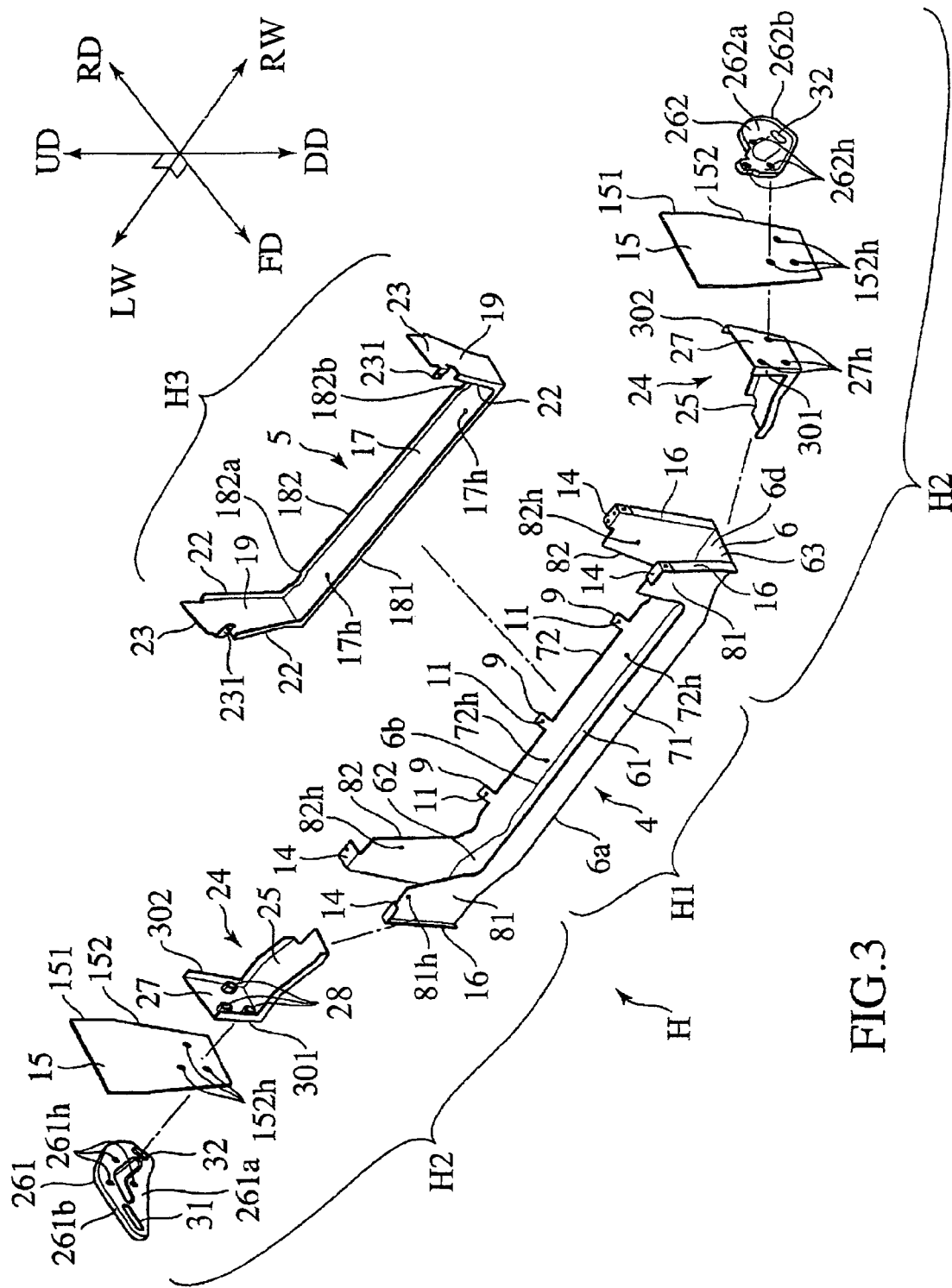
FIG. 3 is an exploded view of a cross frame of the mounting structure of FIG. 1.

The mounting structure M is constituted as the hollow cross frame H (FIGS. 1-3), which is a single integrated frame substantially rectangular in cross section (cf. FIG. 1) and vessel-shaped in longitudinal section (cf. FIG. 2), i.e., having an upper wall portion (with e.g. 17 in FIGS. 1–3), a lower wall portion (with e.g. 6, 25 in FIGS. 1–3), and left and right stepwise raised side portions (with e.g. 15, 19, 27, and 261/262 in FIGS. 2–3).

The cross frame H is constituted with: a vehicle-transversely extending body part H1 (FIGS. 1–3) rectangular in section (i.e., including the lower wall portion and a downside of the upper wall portion); a pair of left and right fixed parts H2 (FIGS. 2–3) (each respectively including an outer wall and an inside of an inner wall of corresponding side portion), which are fixed, as upwardly oriented left and right extensions of the body part H1, to vehicle-transversely spaced horizontal or longitudinal side members 2 (FIG. 2) of a vehicle body of the fuel cell vehicle; and an insert holding part H3 (FIGS. 1–3) (including an upside of the upper wall portion and an outside of each inner wall of both side portions), which is adapted to hold a lower part of the radiator 1 inserted thereto.

In other words, the cross frame H is configured with: a transversely extending frame portion (as H1+H2) fixed to the side members 2; and a receiving portion (as H3) configured on the frame portion (H1+H2) to receive a part of the radiator 1 inserted thereto, more specifically, to receive and bear an array of cushioning rubber dampers 21 (FIGS. 1–2) fixed to lower end projections 1a (FIGS. 1–2) of the radiator 1. The frame portion (H1+H2) as well as the receiving portion (H3) is assembled or integrated in a below-described manner, to be configured as a high-rigid light-weight structure allowing a facilitated insert-mounting of large-scale weighty radiator 1.

In respect of separable constituent members: the body part H1 is configured with a lower fixed support member 4 (FIGS. 1–3), (part 17 of) an upper fixed support member 5 (FIGS. 1–3), and (parts 25 of) left and right reinforcing members 24 (FIGS. 2–3); the left fixed part H2 is configured with (remaining part of) the left reinforcing member 24, a left side plate 15 (FIGS. 2–3), a left hook member 261 (FIGS. 2–3), and (left part 19 of) the upper support member 5; the right fixed part H2 is configured with (remaining part of) the right reinforcing member 24, a right side plate 15 (FIG. 2), a right hook member 262 (FIG. 2), and (right part 19 of) the upper support member 5; and the insert holding part H3 is configured with the upper support member 5.

The lower support member 4, shaped along the length in a U-channel form and stepwise raised at both ends, has: a flat bottom plate part 6 (FIG. 1–3); a front side plate part 71 (FIGS. 1, 3) standing from a front edge 6a (FIG. 3) of an intermediate part 61 (FIGS. 2–3) of the bottom plate part 6, upwardly or in a substantially perpendicular direction to the bottom plate part 6; a rear side plate part 72 (FIGS. 1–3) upwardly standing from a rear edge 6b (FIG. 3) of the intermediate part 61 of bottom plate part 6; a pair of left and right member-fixing front plate parts 81 (FIG. 3) upwardly standing from front edges of left and right raised parts 62 (FIGS. 2–3), 63 (FIG. 3) of the bottom plate part 62; and a pair of left and right member-fixing rear plate parts 82 (FIGS. 2–3) upwardly standing from rear edges of the left and right raised parts 62 of bottom plate part 62. The member-fixing front and rear plate parts 81, 82 are taller than the front and rear side plate parts 71, 72.

The intermediate part 61 of bottom plate part 6 is sized to be greater in width than a thickness T (FIG. 1) of the radiator 1 and a little shorter in length than a width W (FIG. 2) of the radiator 1. The left and right raised parts 62, 63 of bottom plate part 6 are raised (as in FIG. 2) toward the left and right side members 2, respectively, so that they each have a transversely inner part 62a (FIG. 2) obliquely rising from an end of the intermediate part 61, and a transversely outer part 62b (FIG. 2) parallel to the intermediate part 61. The front and rear side plate parts 71, 72 are bent substantially at right angles from the bottom plate part 6, so as to rise toward the radiator 1. The rear side plate 72 has at arbitrary spaced locations on an upper edge thereof a number of (three in this case) insert guiding parts 9 (FIGS. 1–3) formed thereon to guide an insertion of radiator 1 into the insert holding part H3.

Each insert guiding part 9 is provided as an inclined rectangular tongue rising rearward from the upper edge of rear side plate 72, and formed with an accessory or component fixing hole 11 (FIGS. 2–3) for fixing e.g. an accessory of radiator 1, such as a hose or a wiring harness 10 (FIG. 1). In illustration of FIG. 1, a fixing band 12 of the wiring harness 10 has a hook 13 thereof inserted into the fixing hole 11, for engagement therewith to fix the harness 10 to the insert guiding part 9.

The member-fixing front and rear plate parts 81, 82 constituting the fixed part H2 fixed to the side member 2, and taller than the side plate parts 71, 72, are formed at their top edges with member-fixing parts 14, 14 (FIGS. 2–3) forwardly or rearwardly bent substantially at right angles to have rectangular flat pieces sticking fast to a downside 2a (FIG. 2) of the side member 2, to be fixed thereto by a spot welding. The member-fixing parts 14 also constitute the fixed part H2 to the side member 2.

The member-fixing front and rear plate parts 81, 82 further have, at their left or right edges crossing a left edge 6c (FIG. 2) of the left raised part 62 of bottom plate part 6 or a right edge 6d (FIG. 3) of the right raised part 63 of bottom plate part 6, a left or right pair of front and rear side plate fixing parts 16, 16 (FIGS. 2–3) forwardly or rearwardly bent substantially at right angles to provide vertically elongate rectangular flat pieces cooperative for receiving a right or left side of the left or right side plate 15 to be fixed thereto.

The upper support member 5, constituting the body part H1, shaped along the length in a U-channel form and bent upward at both ends, has: a flat top plate part 17 (FIG. 1–3); a radiator-guiding front side plate part 181 (FIGS. 1, 3) rising from a front edge of the top plate part 17, upwardly or in a substantially perpendicular direction to the top plate part 17; a radiator guiding rear side plate part 182 (FIGS. 1, 3) upwardly rising from a rear edge of the top plate part 17; a pair of left and right inclined side plate parts 19 (FIGS. 2–3) obliquely rising from left and right ends of the top plate part 17.

The left and right inclined side plate parts 19 are each formed with a vertically oriented proximal part 19a (FIG. 2) having an identical height to the front and rear side plate parts 181, 182, and a radiator-guiding inclined part 19b (FIG. 2) rising from a top end of the proximal part 19a.

The upper support member 5 is arranged in a spatially superposed relationship to the lower support member 4, and fixed thereto by spot-welding the front and rear side plate parts 181, 182 of the former 5 to the front and rear side plate parts 71, 72 of the latter 4, so that the former 5 appears fitted in the latter 4, cooperatively constituting the body part H1 hollowed to be rectangular in section.

The top plate part 17, to be adapted for a bearing service to the lower part of radiator 1, has a flat upside greater in transverse length than the width W of radiator 1 and a little shorter than a transverse distance between transversely outer pails 62b of the left and right raised parts 62, 63 of bottom plate part 6 of the lower support member 4. The radiator-guiding front and rear plate parts 181, 182 of upper support member 5 are configured to cooperate with the top plate part 17, as well as with the front and rear side parts 71, 72 of the lower support member 4, to constitute the insert holding part H3 for the lower part of radiator 1 to be inserted thereto, more specifically for the array of rubber dampers 21 to be fitted thereto, so that the radiator 1 (more specifically, the array of rubber dampers 21) is fitted and fixed to the insert holding part H3, to be positioned in a vehicle-longitudinal direction. The radiator-guiding rear plate part 182 has a pair of forwardly recessed part 182a (FIG. 3), 182b (FIG. 3) in left and right halves thereof for an ensured clicking insertion of radiator 1.

The left and right inclined plate parts 19 of upper support member 5 are each respectively configured to be cooperative with the left or right pair of member-fixing front and rear plate parts 81, 82 of lower support member 4, to constitute the left or right fixed parts H2. The radiator-guiding inclined part 19b of each inclined plate part 19 is formed at front and rear edges thereof with front and rear fixing plate parts 22 (FIGS. 2–3) bent rightward or leftward substantially at right angles to provide vertically elongate rectangular flat pieces to be spot-welded to the left or right pair of member-fixing front and rear plate parts 81, 82.

The front and rear fixing plate parts 22 are continued or smooth-connected to the radiator-guiding front and rear plate parts 181, 182, respectively, so that these plate parts 181, 182 are cooperative with respective proximal parts 19a of the left and right inclined plate parts 19 to define an elongate rectangular reception space (cf. FIG. 3) that has commensurate outside dimensions to a rectangular imaginary envelope of outer sides of rubber dampers 21, as apparent from FIG. 2.

The inclined plate part 19 further has at a top edge thereof a member-fixing part 23 (FIGS. 2–3) formed, as a flat piece extending substantially in a perpendicular direction to the top plate part 17, sticking fast to a transversely inner side 2b (FIG. 2) of side member 2, to be fixed thereto. The member-fixing part 23 has at a front edge thereof a transversely inwardly bent small piece 231 (FIG. 3).

The lower support member 4 has at both longitudinal ends thereof the left and right reinforcing members 24 nested therein and fixed thereto for reinforcing the left and right fixed parts H2, respectively. The left and right reinforcing members 24 are each shaped along the length in a U-channel form having front and rear side plate parts 301 (FIG. 2), 302 (FIGS. 2–3), and are each bent in an L-form comprised of a substantially transversely extending bottom plate reinforcing part 25 (FIGS. 2–3) contacting on the left or right raised part 62, 63 of bottom plate part 6, and a vertically extending side plate reinforcing part 27 (FIGS. 2–3). The bottom plate reinforcing part 25 is cut at the distal end rear corner.

The bottom plate reinforcing part 25 is let to stick fast to the left or right raised part 62, 63 of bottom plate part 6 of the lower support member 4, and fixed by spot-welding thereto. More specifically, the bottom plate reinforcing part 25 is stepwise deformed to have a transversely extending distal piece 25*a* (FIG. 2) sticking to the intermediate part 61 of bottom plate part 6, an inclined intermediate piece 25*b* (FIG. 2) sticking to the transversely inner part 62*a* of the raised part 62 of bottom plate part 6, and a transversely extending proximal piece 25*c* (FIG. 2) sticking to the transversely outer part 62*c* of the raised part 62 of bottom plate part 6.

Along with such deformation of bottom plate reinforcing part 25, both front and rear side plate parts 301, 302 of the reinforcing member 25 are each likewise deformed, having a transversely oriented distal piece. 302*a* (FIG. 2), an inclined intermediate piece 302*b* (FIG. 2), and a transversely oriented proximal piece 302*c* (FIG. 2). In addition, the front and rear side plate parts 301, 302 of reinforcing member 25 each have a vertical piece 302*d* (FIG. 2) extending along (more specifically, as part of) the side plate reinforcing part 27.

The side plate reinforcing part 27 is fixed at the vertical pieces 302*d* of front and rear side plate parts 301, 302, by spot-welding, to the left or right pair of member-fixing front and rear plate parts 81, 82 rising at both sides of the raised part 62, 63 of bottom plate part 6, so that the member-fixing front and rear plate parts 81, 82 have an increased mechanical strength or rigidity.

The reinforcing member 24, nested in end portion of the lower support member 4, is set flush at its transversely outer side (i.e. at the backside of side plate reinforcing part 27) with respective outer sides of the left or right pair of side plate fixing parts 16, 16.

The left and right side plates 15 are each formed with a rectangular upper part 151 (FIGS. 2–3), and a tailored lower part 152 (FIGS. 2–3). The upper part 151 is let to stick, and spot-welded, to a transversely outer side 2*c* (FIG. 2) of the left or right side member 2 which is rectangular in section. The lower part 152 is tailored at both front and rear edges thereof to a left-end configuration of the lower support member 4, so as to stick to the side plate fixing parts 16 of lower support member 4 and the side plate reinforcing part 27 of reinforcing member 24, and is spot-welded to the fixing parts 16.

The left and right hook members 261, 262 are each respectively formed with a hook body 261*a* (FIGS. 2–3), 262*a* (FIG. 3), and a reinforcing rib 261*b* (FIGS. 2–3), 262*b* (FIG. 3). The body 261*a*, 262*a* is purpose-conformingly shaped to have, e.g., a tow rope application part 31 (FIG. 3) for towing the vehicle, and a loading rope application part 32 (FIG. 3) for a loading of the vehicle on a trailer for transportation.

Each hook member 261, 262 is fastened, together with corresponding side member 15, to the side plate reinforcing part 27 of corresponding reinforcing member 24, by bolts 29 (FIGS. 2–3) to be applied through bolt holes 27*h* (FIG. 3), 152*h* (FIG. 3), and 261*h* (FIG. 3) or 262*h* (FIG. 3) of associated members (24, 15, and 261 or 262), and tightened by nuts 28 (FIG. 2).

The mounting structure M is installed in a radiator accommodating space of the fuel cell vehicle, where its components may be inter-joined or fixed by adequate measures, for example, at locations 17*h*, 72*h*, 81*h*, 82*h* illustratively shown in FIG. 3.

The upper support member 5 as well as the lower support member 4 may have a drain hole or channel at a lowest location when installed.

According to the embodiment described, a high-rigid body part H1 substantially rectangular in section is formed with the lower support member 4 and the upper support member 5, and an insert holding part H3 for holding a lower part 1*a* of a radiator 1 inserted thereto is formed on the high-rigid body part H1, whereby the radiator 1 can be positioned to be fixed in a vehicle-longitudinal direction.

The radiator 1, addressed to a fuel cell vehicle and large in size and weighty, is supported by the high-rigid body part H1 between the side members 2, without needing mount pins or elastically mounted brackets, and can be free from anxieties to associated faults such as pin breakage, allowing for a reduced number of components.

The insert holding part H3 has an insert guiding part (9, 19) for guiding the insertion of radiator 1 thereto, allowing a facilitated insertion of the radiator 1 which is so large in size and weighty as to constitute a difficulty when otherwise inserted.

The insert guiding part is formed with a fixing hole 11 available for fixing accessories, such as a hose or wiring harness 10 connected to the radiator 1.

The lower support member 4 is reinforced with reinforcing members 24 fitted in both transverse ends thereof, and can have an increased rigidity.

The reinforcing members 24 as part of high-rigid fixed parts H2 have hook members 261, 262 fastened thereto, which are formed with a traction rope application part 31 and a loading rope application part 32, allowing for effective contribution of the fixed parts H2 to the rigidity of vehicle body in a tow of vehicle, as well as in a transportation of loaded vehicle.

The mounting structure M is addressed to the radiator 1 as a heat exchanger for a fuel cell vehicle, which may be other than a radiator, and may be a condenser for example.

The entire contents of Japanese Patent Application No. 2003-351942 are incorporated herein by reference.

While an embodiment of the invention has been described using specific terms, such description is for illustrative purposes, and changes and variations may be made without departing from the spirit or scope of the following claims.

What is claimed is:

1. A mounting structure for a heat exchanger to be mounted to a vehicle body having vehicle-transversely spaced side members, the mounting structure comprising:
   a single integrated, vessel-shaped hollow cross frame, which comprises:
      a vehicle-transversely extending frame portion fixed to the side members; and
      a receiving portion with a U-shaped cross section, configured on the frame portion, as an insert holding part to receive, bear, and hold a part of a heat exchanger inserted into an open side of the receiving portion.

2. The mounting structure as claimed in claim 1, wherein the frame portion comprises a pair of fixed parts fixed to the side members, and a body part extending therebetween and substantially rectangular in section, and wherein the receiving portion is formed on the body part.

3. The mounting structure as claimed in claim 1, wherein the receiving portion has a guide part configured to guide an insertion thereto of said part of the heat exchanger, wherein said part of the heat exchanger comprises an array of dampers fixed to lower end projections of the heat exchanger.

4. The mounting structure as claimed in claim 3, wherein the guide part is configured to receive application of an accessory of the heat exchanger.

5. The mounting structure as claimed in claim 1, wherein the frame portion has a fixed part fixed to a side member and reinforced with a reinforcing member fixed thereto.

6. The mounting structure as claimed in claim 5, wherein the frame portion has a hook member fixed to the reinforcing member, wherein the hook member is configured for a vehicle tow.

7. The mounting structure as claimed in claim 1, wherein the heat exchanger comprises a fuel cell vehicle oriented radiator.

8. The mounting structure as claimed in claim 1, wherein the mounting structure is substantially rectangular in cross section.

9. The mounting structure as claimed in claim 1, wherein the receiving portion is configured to receive at least an end of the heat exchanger such that at least the part of the heat exchanger fits inside of the receiving portion.

10. The mounting structure as claimed in claim 9, wherein the frame portion is configured to receive the receiving portion such that at least a portion of the receiving portion fits inside of the frame portion.

11. A mounting structure for a vehicle heat exchanger, comprising:
a frame portion that is configured to extend across a vehicle in a transverse direction of the vehicle; and
a receiving portion with a U-shaped cross section that is configured to receive and hold at least a part of a heat exchanger that is inserted into an open side of the receiving portion;
wherein the mounting structure is a vessel-shaped, hollow structure with a substantially rectangular cross-section.

12. The mounting structure as claimed in claim 11, wherein the frame portion comprises a pair of fixed parts and a body part extending between the pair of fixed parts;
wherein the fixed parts are fixed to side members of the vehicle;
wherein the body part is substantially rectangular in cross section.

13. The mounting structure as claimed in claim 12, wherein the fixed parts each comprise a reinforcing member.

14. The mounting structure as claimed in claim 13, wherein the fixed parts comprise a hook member.

15. The mounting structure as claimed in claim 11, wherein a bottom part of the receiving portion forms a top of the substantially rectangular cross-section.

16. The mounting structure as claimed in claim 11, wherein the frame portion is substantially U-shaped in cross section.

17. The mounting structure as claimed in claim 11, wherein the receiving portion comprises a guide part that is configured to guide insertion of the heat exchanger into the receiving portion.

18. The mounting structure as claimed in claim 11, wherein the frame portion comprises a lower support member with an intermediate bottom plate part, oblique bottom plate parts that rise obliquely from ends of the bottom plate part, and outer bottom plate parts extending from ends of the oblique bottom plate parts, wherein the outer bottom plate parts are arranged parallel to the intermediate bottom plate part.

19. The mounting structure as claimed in claim 18, wherein the frame portion comprises a pair of fixed parts and a body part extending between the pair of fixed parts;
wherein the fixed parts each comprise a reinforcing member.

20. The mounting structure as claimed in claim 19, wherein each reinforcing member comprises a distal piece with a substantially similar shape to the intermediate bottom plate part, an inclined intermediate piece with a substantially similar shape to one of the oblique bottom plate parts, and a proximal piece with a substantially similar shape to one of the outer bottom plate parts.

* * * * *